(12) United States Patent
Stengel et al.

(10) Patent No.: US 12,348,954 B2
(45) Date of Patent: Jul. 1, 2025

(54) VISION-BASED SOUND SIMULATION FOR CORRECTING ACOUSTICS AT A LOCATION

(71) Applicant: NVIDIA Corporation, Santa Clara, CA (US)

(72) Inventors: Michael Stengel, Santa Clara, CA (US); Ward Lopes, Santa Clara, CA (US); Joohwan Kim, Santa Clara, CA (US); David Luebke, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 252 days.

(21) Appl. No.: 18/147,915

(22) Filed: Dec. 29, 2022

(65) Prior Publication Data

US 2024/0223991 A1 Jul. 4, 2024

(51) Int. Cl.
*H04S 7/00* (2006.01)
*G01S 17/86* (2020.01)
*G01S 17/89* (2020.01)

(52) U.S. Cl.
CPC ............... *H04S 7/40* (2013.01); *G01S 17/86* (2020.01); *G01S 17/89* (2013.01); *H04S 7/301* (2013.01); *H04S 7/302* (2013.01)

(58) Field of Classification Search
CPC . H04S 7/40; H04S 7/301; H04S 7/302; G01S 17/86; G01S 17/89
See application file for complete search history.

(56) References Cited

U.S. PATENT DOCUMENTS

2004/0264704 A1* 12/2004 Huin .................. H04S 7/301
381/59

FOREIGN PATENT DOCUMENTS

JP 7032837 B1 * 3/2022

OTHER PUBLICATIONS

English machine translation of JP7032837B1 (Yasuji et al., Sound wave propagation simulation system, published Mar. 2022) (Year: 2022).*

(Continued)

*Primary Examiner* — Mark Fischer

(57) ABSTRACT

The disclosure provides a method for audio calibration that uses audio simulation and reconstructed surface information from images or video recordings along with recorded sound. The surface component of the method introduces knowledge that enables audio wave propagation simulation for a particular location. Using the simulation results the sound distribution can be optimized. For example, unwanted audio reflection and occlusion can be recognized and resolved. In one example, the disclosure provides a method for improving acoustics at a location that includes: (1) generating a geometric model of a location using visual data obtained from the location, wherein the location includes an audio system, and (2) simulating, using the geometric model, movement of sound waves in the location that originate from the audio system. The disclosure also provides a computer system, a computer program product, and a mobile computing device that include features for improving acoustics at a location.

27 Claims, 8 Drawing Sheets

(56) References Cited

OTHER PUBLICATIONS

Xiao, et al.; "Few-Shot Object Detection and Viewpoint Estimation for Objects in the Wild"; ECCV; Jul. 23, 2020; 18 pgs.
Lichy, et al.; "Shape and Material Capture at Home"; CVPR; Apr. 13, 2021; 27 pgs.
Yariv, et al.; "Multiview Neural Surface Reconstruction by Disentangling Geometry and Appearance"; 34th Conference on Neural Information Processing Systems (NeurIPS 2020); Oct. 25, 2020; 18 pgs.
Murphy, et al.; "Acoustic Modeling Using the Digital Waveguide Mesh"; IEEE Signal Processing Magazine; Mar. 2007; 12 pgs.
Dantrey, et al.; "VRWorks Audio Dials up the Immersion with RTX Acceleration"; Technical blog; NVIDIA; 2019; 3 pgs. https://developer.nvidia.com/blog/vrworks-audio-dials-up-the-immersion-with-rtx-acceleration/.

* cited by examiner

VISION-BASED SOUND SIMULATION FOR CORRECTING ACOUSTICS AT A LOCATION

TECHNICAL FIELD

This application is directed, in general, to audio systems and, more specifically, to improving the audio experience for listeners in specific locations.

BACKGROUND

Home entertainment systems provide a great option for viewing shows, playing video games, and listening to music. With the success of high definition video streaming and multi-channel audio streaming, the popularity of home entertainment systems should increase. Regardless of how used, high audio quality is an important aspect when using home entertainment systems. Due to the high dependency of audio delivery on the acoustics of listener's room, high audio quality is typically achieved through custom sound calibration.

Previous audio correction methods for rooms use a microphone and a sparse set of sound measurements. The existing methods, however, use rough speaker distance approximation and correction by adjusting gain and tonal adjustment (equalization). Optimization of a speaker position for the home entertainment systems is typically through a trial and error process, such as moving your speakers around in the room, and therefore very time consuming and practically impossible for non-experts. The calibration method can be error-prone since there is no validation if sound measurement is done correctly by the user. Various problems can include the wrong microphone position, background noise, saturation of the microphone response, etc.

SUMMARY

In one aspect, the disclosure provides a method for improving acoustics at a location. In one example, the method includes: (1) generating a geometric model of a location using visual data obtained from the location, wherein the location includes an audio system, and (2) simulating, using the geometric model, movement of sound waves in the location that originate from the audio system.

In another aspect, the disclosure provides a computer system for improving acoustics at a location. In one example the computer system has one or more processors to perform operations that include: (1) generating a geometric model of a location using visual data obtained from the location, wherein the location includes an audio system, and (2) simulating, using the geometric model, movement of sound waves in the location that originate from the audio system.

In yet another aspect, the disclosure provides a computer program product having a series of operating instructions stored on a non-transitory computer readable medium that direct operations of one or more processors to improve acoustics at a location. In one example the operations include: (1) generating a geometric model of a location using visual data obtained from the location, wherein the location includes an audio system; and (2) simulating, using the geometric model, movement of sound waves in the location that originate from the audio system.

In still one other aspect, the disclosure provides a mobile computing device In one example, the mobile computing device includes: (1) one or more cameras, (2) at least one microphone, and (3) at least one processor that coordinates obtaining visual data of a location using the one or more cameras and audio measurements at the location using the at least one microphone, wherein at least a portion of the visual data corresponds to obtaining the audio measurements and includes a position of the at least one microphone when obtaining the audio measurements.

BRIEF DESCRIPTION

Reference is now made to the following descriptions taken in conjunction with the accompanying drawings, in which.

DETAILED DESCRIPTION

Figure 1:
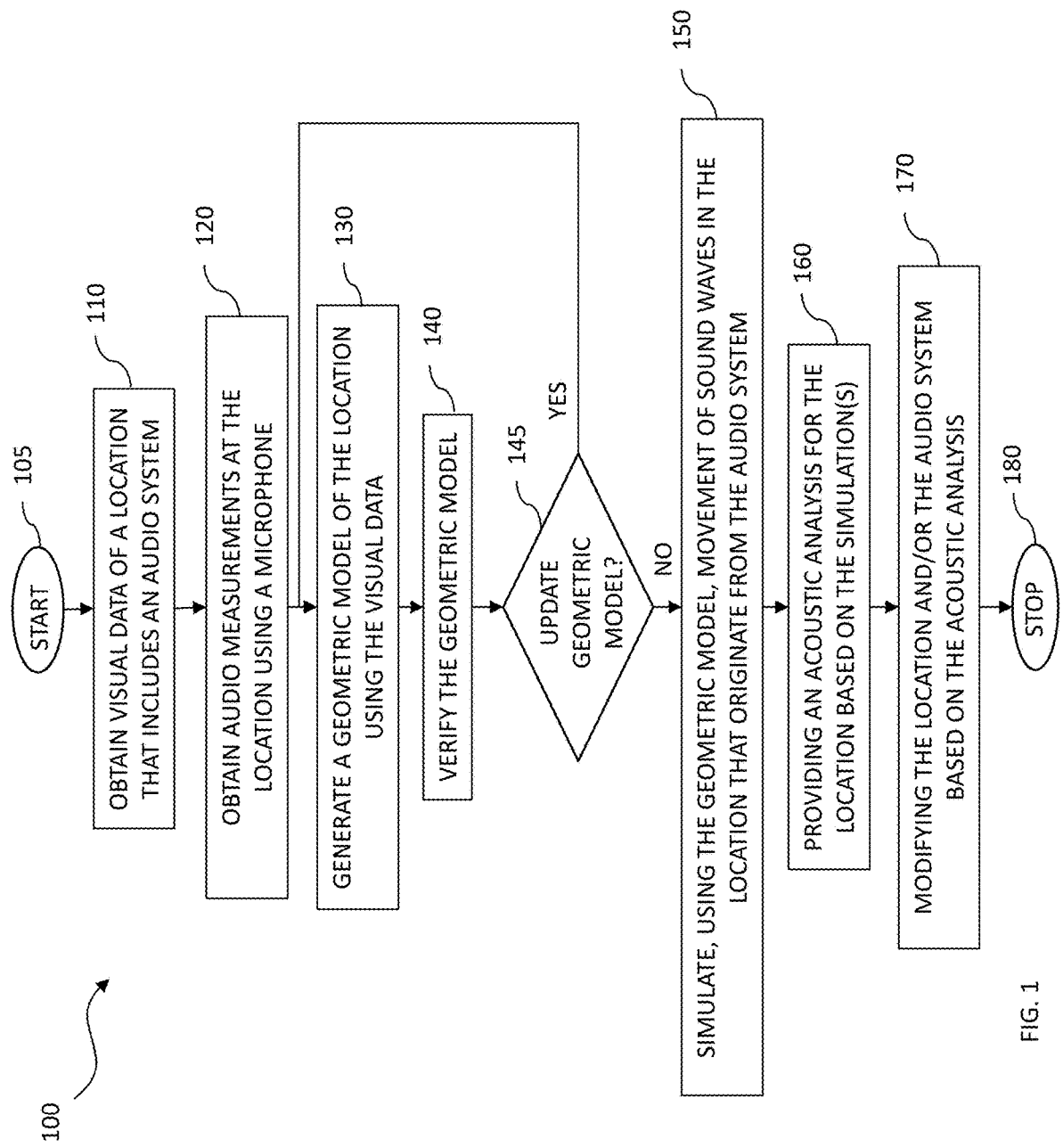
FIG. 1 illustrates a flow diagram of an example of a method of improving acoustics at a location carried out according to the principles of the disclosure.
Figure 2:
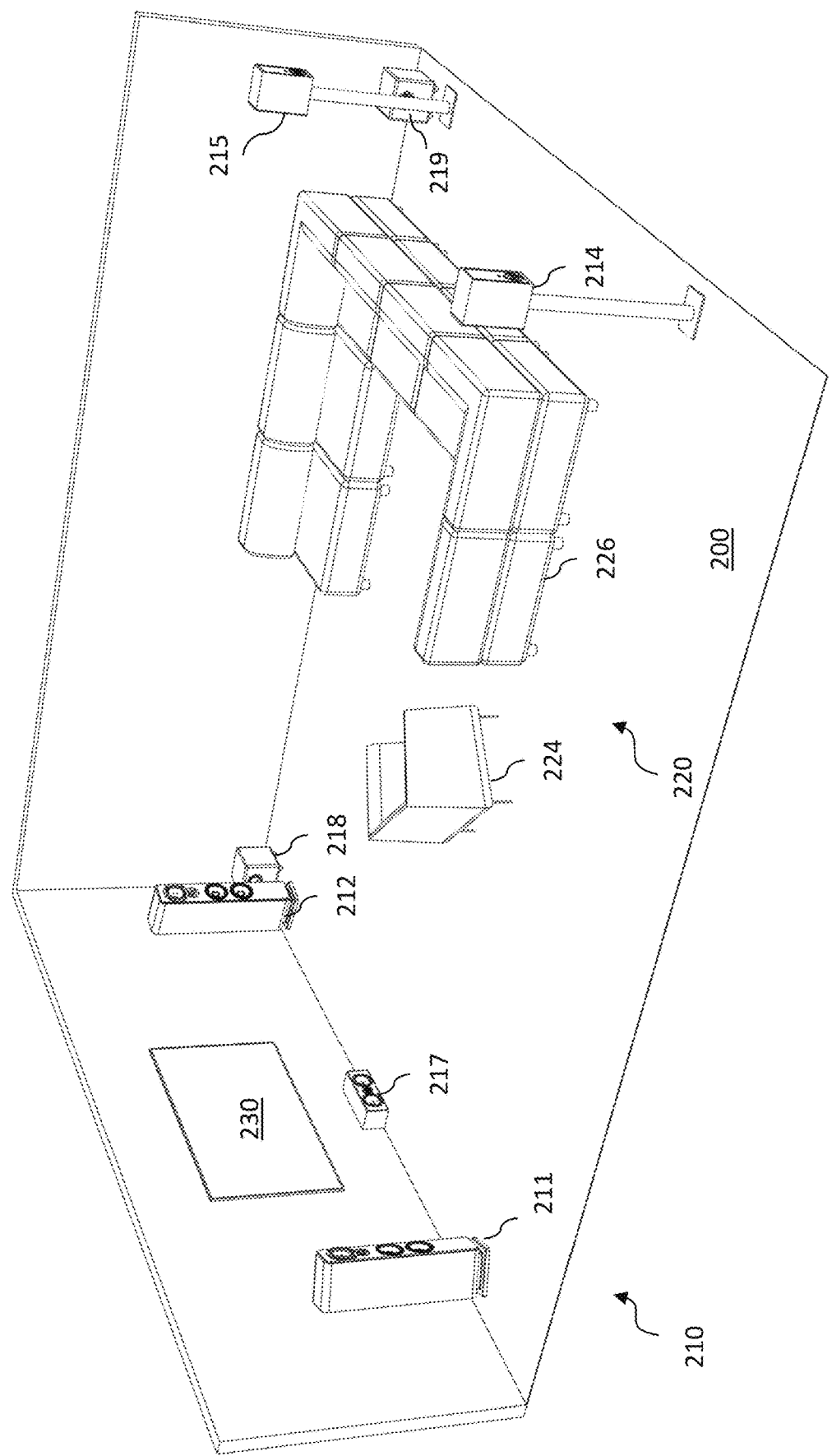
FIGS. 2 to 6 illustrate views of a room and provides examples of improving acoustics in a room according to the principles of the disclosure.

Established consumer-level calibration methods use a microphone for computing audio compensation filters for correcting room acoustics. Such calibration setup has limitations since the model has no information about the room geometry and material and can only approximate the speaker positions from the sparse set of sound samples. Such black-box calibration can reduce audio issues by filtering, but it is impossible to predict if an adjustment of the speaker layout or adjustments to the room could more successfully improve audio quality. Accordingly, higher quality room correction often requires hiring experts.

The disclosure provides audio optimization for a location using a room correction method for calibration and an enhanced acoustic simulation model. The disclosure provides a method for audio calibration that uses audio simulation and reconstructed surface information from images or video recordings along with recorded sound. The surface component of the method introduces knowledge that enables audio wave propagation simulation for a particular location. Using the simulation results the sound distribution can be optimized. For example, unwanted audio reflection and occlusion can be recognized and resolved, or speaker positions or listener positions can be improved.

Thus, in contrast to existing audio calibration systems, the approach advantageously uses visual data obtained from a camera for modeling a location for audio calibration. Room shape and room material reconstruction allows more precise, more extensive, and iterative acoustics simulation which enables a user-friendly recommendation system on improving perceived audio.

The disclosed system can also use a microphone for additional audio optimization when coupled with the camera during sound recording. Camera-based microphone tracking is also disclosed to avoid user errors during the recording of sound signals for sound calibration.

The disclosed system and method can be implemented on one or more processors that perform operations including providing an acoustical analysis for a location using visual data. The functionalities of the disclosed method can be distributed to different processors. The processor or processors can be located at a data center that is remote from the location. Accordingly, a cloud-based server or servers can be used to perform one or more of the operations. The one or more processors can also be located on a computing device proximate the location. A processor of a mobile computing device, such as used to obtain sound measurements and visual data, can be used to perform one or more of the operations. The mobile computing device can be, for example, a smart phone, a computing pad, a laptop, or another type of mobile computing device having a camera and a microphone.

Visual data includes image data, such as photographs or videos. The visual data can also include other types of data that can be used to simulate the objects and configuration of a location. For example, the visual data can include light detection and ranging (LiDAR) data. The visual data can be 2D or 3D data. One or more of the different types of visual data can be used for reconstructing a location.

Figure 6:
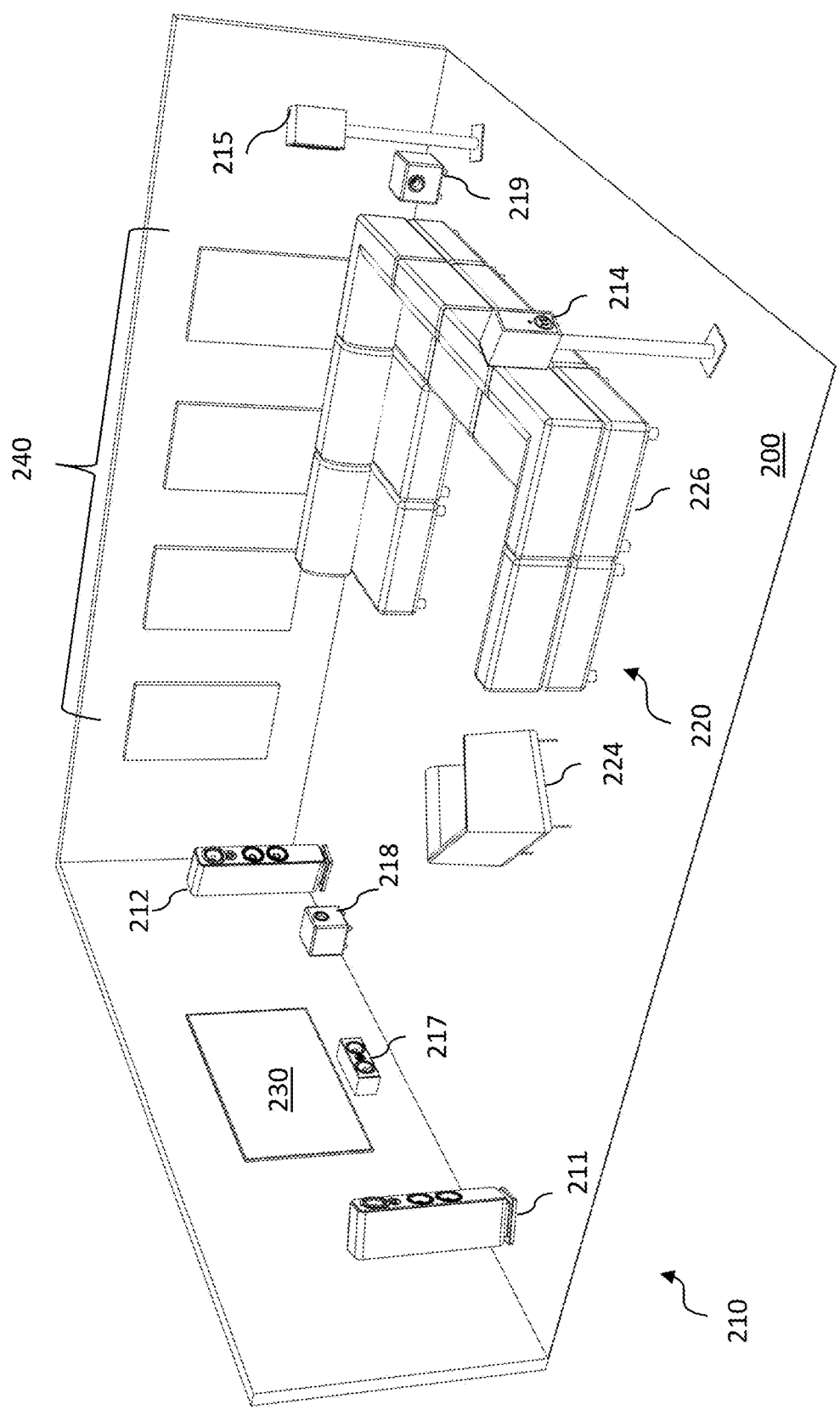
Figure 7:
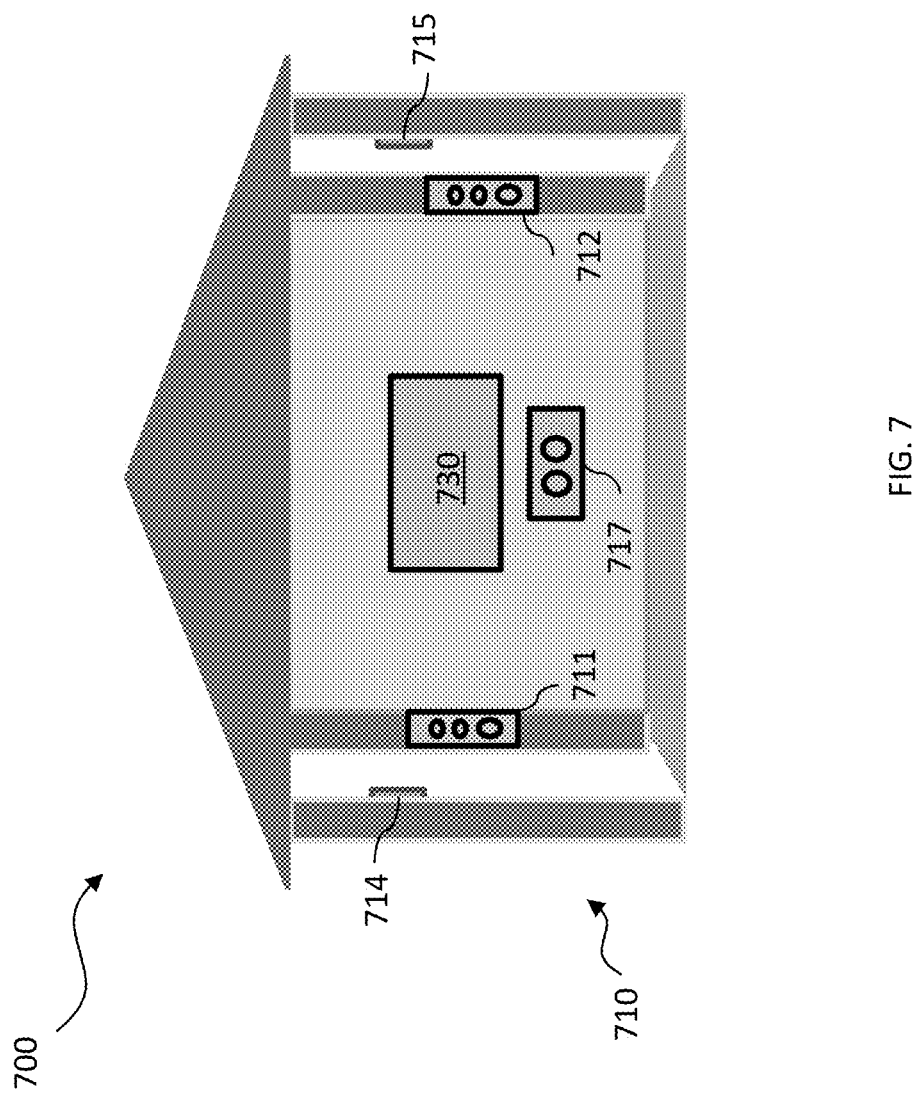
FIG. 7 illustrates an example of a partially enclosed location having various components of an audio system as an example of a location wherein acoustics can be improved according to the principles of the disclosure.

A location can be a room that is enclosed or partially enclosed. For example, a location can be a room within a dwelling (home, apartment, condominium, dormitory, etc.) or a commercial building, such as an office. The room can be designed for a home theater or even a public theater. FIGS. 2 to 6 illustrate an example of a location that is an enclosed room having a bottom (e.g., floor), a top (e.g., ceiling), and four sides (e.g., walls). Two walls and the ceiling are removed in the cut-away views of FIGS. 2 to 6. The location can be a partially enclosed structure that can be located outside. An example of a partially enclosed location has at least one open side or top. FIG. 7 illustrates an outdoor structure, such as an outdoor living area or pergola, having one side (e.g., wall), a bottom (e.g., floor), and a top (e.g., roof).

An audio system includes at least one speaker that generates sound waves. The audio system can include multiple speakers, such as in a surround sound system, and other components, such as a subwoofer. A speaker or speakers of the audio system can be integrated speakers of a viewing device positioned at a location, such as a television or a computer display.

FIG. 1 illustrates a flow diagram of an example of a method 100 of improving acoustics at a location carried out according to the principles of the disclosure. One or more of the steps of method 100 can be carried out by a series of operating instructions that direct the operation of at least one processor. The series of operating instructions correspond to an algorithm or algorithms that relate to improving acoustics at a location. The series of operating instructions can be stored on a non-transitory computer-readable medium, such as a computer program product. The at least one processor can be integrated with a computing device located at or proximate the location, such as a desktop computer, a laptop, a computing pad, or smartphone. The at least one processor can also be part of a computing device located in the cloud, such as a cloud-based server.

FIGS. 2-7 illustrate a cut-away view of a room 200 having various components of an audio system 210 and furniture 220 as an example of a location that will be referred to for various steps of method 100. The audio system includes front left and front right speaker 211, 212, rear left and rear right speakers 214, 215, a center speaker 217, and subwoofers 218, 219. The furniture 220 includes a chair 224 and a couch 226. Also within room 200 is a screen 230, which is the reference for the left and right speakers of the audio system 210. At least a portion of the method 100 can be carried out by a computing system, such as computing device 800 of FIG. 8, which provides acoustic analysis. The method 100 starts in step 105.

Figure 3:
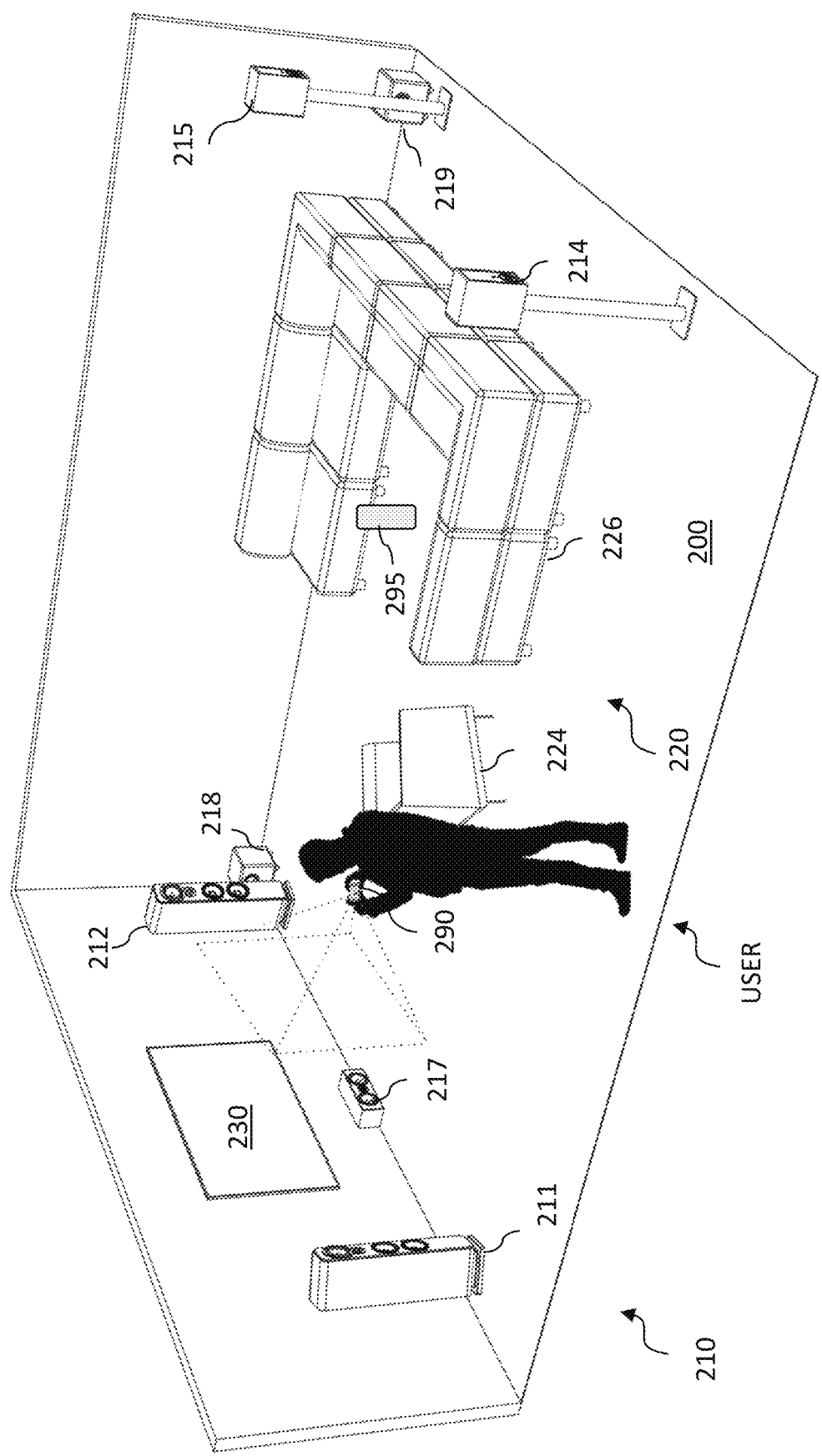

In step 110, visual data of a location that includes an audio system is obtained. A mobile computing device can be used to obtain the visual data. For example, a user can take photos, video and optionally obtain LiDAR data of a location using a mobile communication device. FIG. 3 illustrates a user obtaining visual data of the room 200 using a mobile computing device 290, which can be a smart phone. The user can rotate to obtain 360 degrees of visual data within room 200. Additionally, geometrical or positional sensors (e.g. global positioning system (GPS) sensors, gyroscope, and inertial measurement units (IMUs)), can be used to collect positional data of the location and synchronized with visual data of the room, to enhance accuracy of surface acquisition and for future reference during the optimization/validation process later.

Audio measurements at the location are obtained in step 120 using a microphone or microphones. The audio measurements can be obtained while obtaining the visual data or can be obtained at another time, such as after verification of a geometric model of the location. Positioning of the microphone within the location can correspond with a position of the device used to obtain the visual data. The same device used to obtain the visual data can also be used to obtain the audio measurements. For example, mobile computing device 290 can be used to obtain both the visual data and the audio measurements. The microphone can also be positioned to correspond to where people may be within the room 200 when viewing the screen and listening to audio. As an example, microphone 295 is shown proximate the couch 226. The position of the microphone 295 within the room 200 can be obtained and sent for processing along with the audio measurements. The position of the microphone 295 can be manually entered. For example, location x, y, z and rotation yaw-pitch-roll with respect to the reference coordinate system of the room 200 can be entered. For simplicity, these parameters spanning six degrees of freedom can represent the 'microphone location' for simplicity in the following discussion.

In step 130, a geometric model of the location is generated using the visual data. The geometric model is a three dimensional construction of the location using the visual data. The geometric model includes estimated objects within the location and one or more of the surfaces, layout, or material information of the objects. For example, a geometric model of room 200 can be generated using the visual data obtained by the user of FIG. 3. From the visual data, the surfaces and material of the chair 224 and the couch 226 can be estimated. Using the visual data, possible listener positions can also be identified when generating the geometric model. Additionally, the orientation and ear height for the possible listener positions can be estimated. The position of a microphone, such as the one or more microphones of mobile computing device 290 or microphone 295, can also be used to identify a listener positioner. The position of a microphone can also be determined via the visual data.

For example, the location of a microphone inside the room 200 can be estimated from the visual data along with the room geometry. For example, the microphone 295 can be visually recording during the sound measurement in the form of a video of the microphone 295 (outside-in-tracking) or the video of the room 200 with the microphone attached to the camera (inside-out tracking), such as the one or more microphones and the one or more cameras of the mobile computing device 290.

The benefit of the proposed tracking of the microphone location is to avoid human errors, such as via manual inputs, and wrong assumptions about the recording setup during calibration. For example, if during the calibration recording the microphone is too far away from the assumed listener position or not aligned with ear level the calibration method can inform the user to repeat the step. The computed microphone position also allows the equalization routine to be more precise as the distance between listener and speakers can be estimated more accurately.

One or more processors of a least one computing device can be used to generate the geometric model. When the computing device is located proximate the location, the user can send the visual data for processing via a local communications network, such as via a wireless local area network (WLAN). When the computations are performed via a computing device in the cloud, the user can upload the visual data via a cloud-based network environment connected to a server configured to perform the computations. The WLAN can be used to connect to the communications network. The audio measurements can also be sent or uploaded for additional processing.

The one or more processors can use the visual data to create the geometric model according to various processes, such as conventional processes, which can be used for:
  Room surface geometry and material reconstruction,
  Object detection and object pose estimation (such as via a learning-based method),
  Speaker recognition (of the audio system),
  Listener estimation (location, orientation), and
  Screen estimation (location, extent).

Accordingly, generating the geometric model can include one or more of reconstructing surface geometries, reconstructing material of the geometries, detecting objects, estimating object poses, recognizing audio system configuration, estimating listener position, and estimating screen position. The geometric model can be a 3D model generated from 2D data. Proprietary or public algorithms can be used to generate the geometric model. For example, known techniques such as a neural architecture system can be used to learn 3D geometries from 2D data can be used. Additionally, existing techniques for estimating geometry and reflectance of objects using camera data, and for detecting objects from 2D data and estimating the detected objects' 3D pose can be used. The visual data used for generating the geometric model can also be 3D in some examples, wherein the appropriate proprietary or public algorithm would be used for generating the geometric model.

The geometric model can be verified in step 140. The geometric model can be sent to the user for verification. The geometric model can be visualized on a screen of a computing device of the user for verification. For example, the mobile computing device 290 can be used to verify the geometric model. Additionally, the screen 230 can be connected to a computing device, including mobile computing device 290, and used to display the geometric model for verification. The user can verify that the location is constructed correctly. For example, the user can verify objects in the geometric model, such as the chair 224 and the couch 226, are positioned and represented correctly. Additionally, the user can verify that materials of the objects are correct.

An example of what a user can verify includes:
  room has been reconstructed correctly,
  speakers have been recognized and correctly assigned (e.g., channel, position, orientation),
  listeners have been recognized (e.g., position, orientation),
  walls have been correctly recognized and materials assigned, and
  a screen or screens, such as computer display, TV, or projection screen, have been recognized correctly.

A determination is made in step 145 if the geometric model needs to be updated. Based on step 140, the user can determine that one or more components of the geometrical model should be updated. As such, the user can input additional data to improve the geometric model. For example, the user can correct material types, surface areas of the objects, or object positioning. The user can also include constraints for the geometric model. For example, the user can identify locations where speakers 214 and 215, screen 230, and the chair 224 or couch 226 can be located in room 200. The different constraints can be denoted as fixed or variable.

If updating is needed, method 100 continues to step 130 and the updated information is made available to the one or more model processors for modification. The updated information can be manually input. For example, the user can apply corrections to the geometric model, such as the speaker location or wall/furniture material assignment, if necessary. The geometrical model can also automatically supply modifications if a user requests a change. For example, the geometrical model may have originally determined a surface is wood and alternatively determined the surface may have a plastic coating over the wood. Accordingly, the geometrical model can be automatically updated with another determined parameter, such as plastic, after a user indicates the wood surface is incorrect. Method 100 continues to step 140 and 145 again after step 130.

Figure 4:
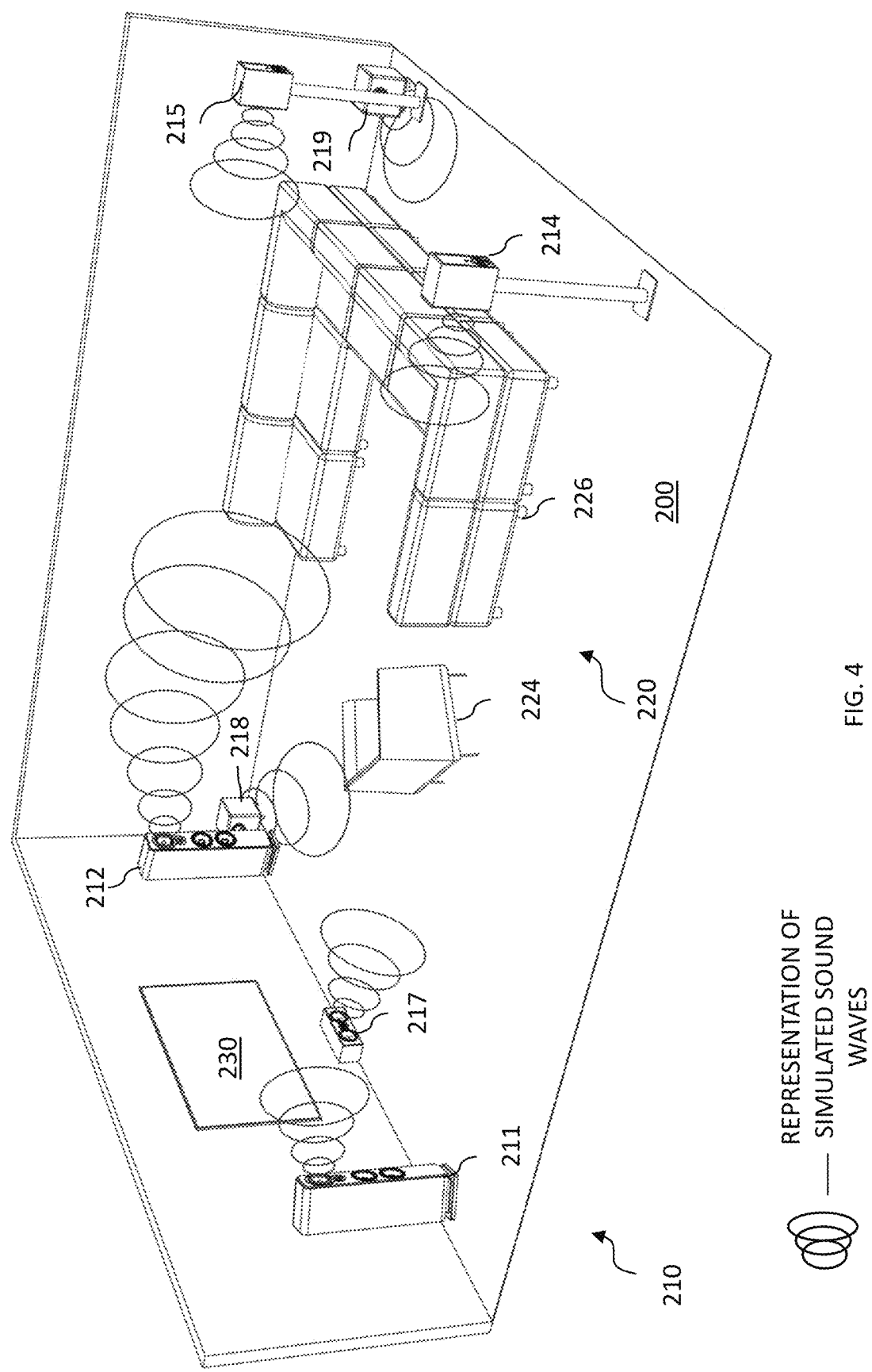

If the geometric model does not need an update, method 100 continues to step 150. Using the geometric model, movement of sound waves in the location that originate from the audio system are simulated in step 150. Using the estimated room surface, layout information, and material information the simulation can compute how sound waves of different frequencies originating at the speaker locations travel through the location and are received at at least one listener position. A listener position represented in the geometric model can be used for the simulation. For high accuracy, this process can use a physically based audio wave propagation model. FIG. 4 illustrates an example of simulating the sound waves using a geometrical model of the room 200. More than one listener position can be used for simulation and the multiple listener positions can be used to dynamically change the audio system when a listener changes positions.

Simulation of the movement of the sound waves identifies problems that can then be solved resulting in improved acoustics for the location. For example, the simulations can identify and solve for unwanted sound wave reflections, unwanted frequency build up, and unwanted audio cancellation. The simulation computations can to some extent be accelerated by using a GPU for processing and ray tracing, path tracing, neural networks, or other accelerated computing structures or rendering methods. Proprietary or public audio simulation algorithms can be used. For example, a numerical simulation technique, such as digital waveguide mesh (DWM). Regardless, the simulation computations can be perform in a cloud-based environment.

The disclosure recognizes that audio reflections are highly dependent on the room shape, positions of the speakers, the listeners seating position and the wall materials. Changing any of the parameters can drastically change the outcome. A goal of the audio simulation is not only approximating the sound distribution of the current location and changing the amplitude of different audio frequencies provided to each speaker but also proposing possible layout changes and the resulting effects for perceived audio quality. To account for the fact that audio quality can depend on position within the room, audio simulation of the room could be used to adjust frequency equalization on a per speaker basis and optimize output to the speakers based on the user's position within the room. The simulation can run multiple iterations with component layouts, wherein different modification of the geometric model can be used. This allows the method 100 to simulate if a certain configuration gives better results and optimize the layout. For example, the couch 226 and the speakers 211, 212, can be moved for one simulation and the chair 224 and the center speaker 217 can be moved for another simulation.

In step 160, an acoustic analysis for the location based on the one or more simulations of step 150 are provided. The acoustic analysis can include potential audio issues with current speaker or subwoofer layout (such as audio cancellation or frequency build up), improved layout of components of the audio system (avoiding potential audio issues), and/or configuration improvements for the location. The configuration improvements can include moving objects positioned within the location, removing objects within the location, or adding components, such as a proposal of acoustic panels to treat sound reflections for the location. The acoustic analysis can be sent to the user for review. The acoustic analysis can also be based on the audio measurements for gain normalization and frequency equalization. Accordingly, the acoustic analysis can use the geometric model and the audio measurements.

Figure 5:
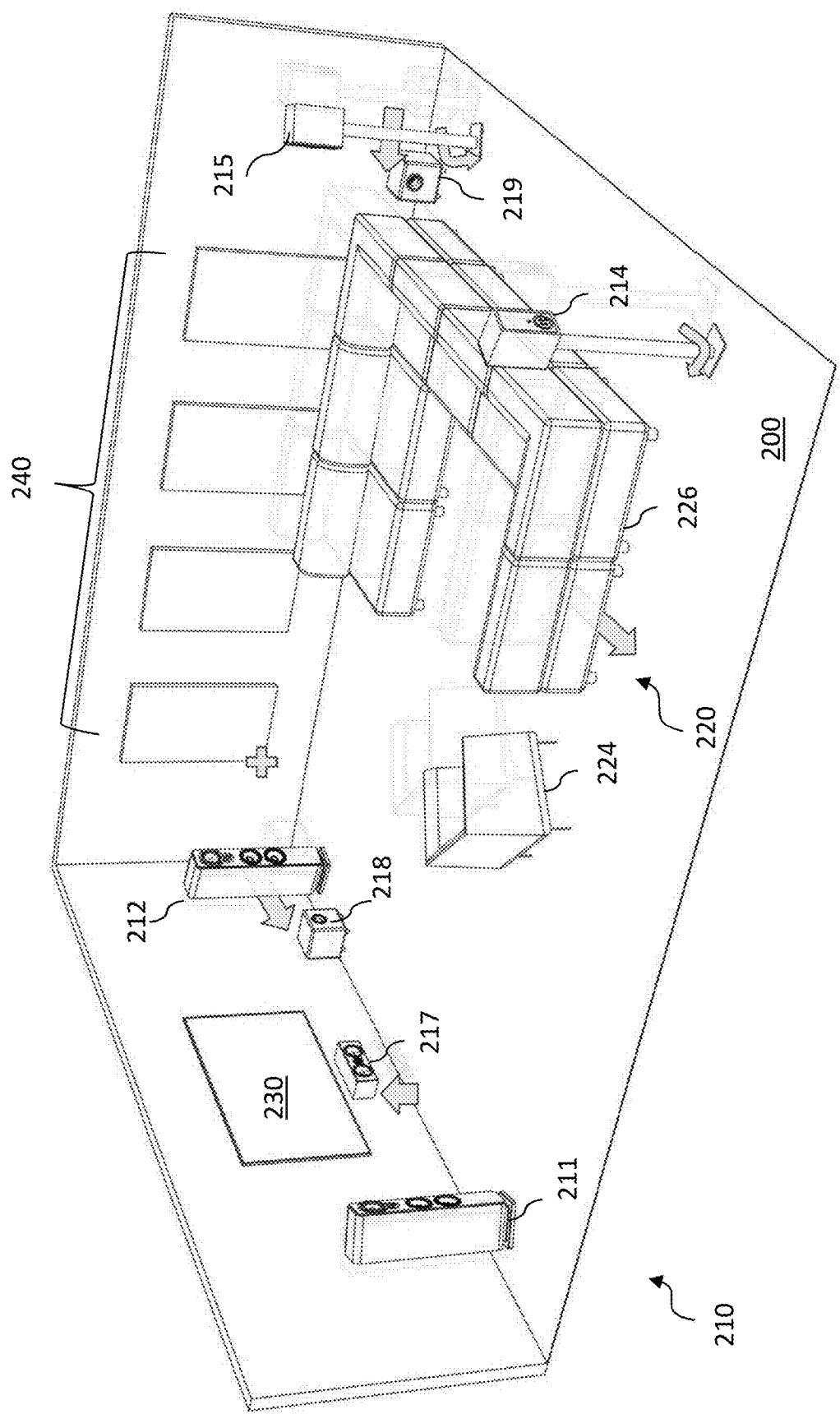

FIG. 5 illustrates examples of suggested improvements for room 200 from the acoustic analysis. The arrows indicate suggested relocations for the center speaker 217, subwoofers 218, 219, the rear left and right speakers 214, 215, and the couch 226. The suggested relocations can include rotating a component of the audio system 210 in addition to or instead of lateral movement. The suggested relocation of the rear left and right speakers 214, 215, include rotation along with lateral movement. In addition to the repositioning within the room 200, FIG. 5 also illustrates the addition of acoustic panels 240.

In step 170, the location and/or the audio system are modified based on the acoustic analysis. FIG. 6 illustrates modifications made to the room 200 and the audio system 210 according to the acoustic analysis. The modifications can be based on the acoustic analysis of a single listener position, such as represented in the geometric model. A listener position can be for one person, such as the chair 224, or can include multiple people, such as for an area within a location. For example, a listener position can be defined as an area of the couch 226. Dynamic modifications can also be made as a listener or listeners change positions. More than one listener position can be used for simulation and the multiple listener positions can be used to dynamically change the audio system 210 when a listener changes positions, such as from the chair 224 to the couch 226.

Dynamic modifications can be made based on audio, visual, or a combination thereof from using microphones and cameras that are at a location and used to detect when a listener or listeners move and the new positions to which they move, i.e., movement information. How or to what application the movement information is provided may be limited due to privacy concerns. For example, the listener's movement information may only be provided to the computing system that performs the acoustic analysis. Movement information can be obtained from a beacon or tracking device that is located on a listener. For example, a listener can use a head-mounted display (HMD), such as a type of reality headset including a virtual reality (VR), augmented reality (AR), or mixed reality (MR) headset, which includes a beacon that allows tracking of the listener while moving about a location. The listener can use the HMD for visual input instead of the screen 230 and use the audio system 210 for audio input. The beacon can be used with other devices for detecting position changes, such as the microphones, cameras, or combination thereof. One or more of the beacons, microphones, or cameras can be used to also determine the orientation of a listener at a location for further modifications to the audio system 210.

Dynamic modifications can be automatically initiated based on detected movement, such as based on movement information. Dynamic modifications can also be manually initiated, such as via voice commands or hand movements. For example, a listener can state a voice command to optimize the acoustics for the couch 226 as the listener moves from the chair 224 to the couch 226. A user may select that the user position is fixed. As such, dynamic modifications would not be allowed. The method 100 continues to step 180 and ends.

FIG. 7 illustrates an example of a partially enclosed location 700 having various components of an audio system 710 as an example of a location wherein acoustics can be improved according to the principles of the disclosure. The audio system 710 includes front left and front right speaker 711, 712, back left and back right speakers 714, 715, and a center speaker 717. Also within the partially enclosed location 700 is a screen 730, which is the reference for the left and right speakers of the audio system 710. The partially enclosed location 700 is an outdoor structure, such as an outdoor living having one side (e.g., wall), a bottom (e.g., floor), and a top (e.g., roof). As described with respect to FIGS. 2-6, method 100 can be similarly used to improve acoustic at the partially enclosed location 700.

Figure 8:
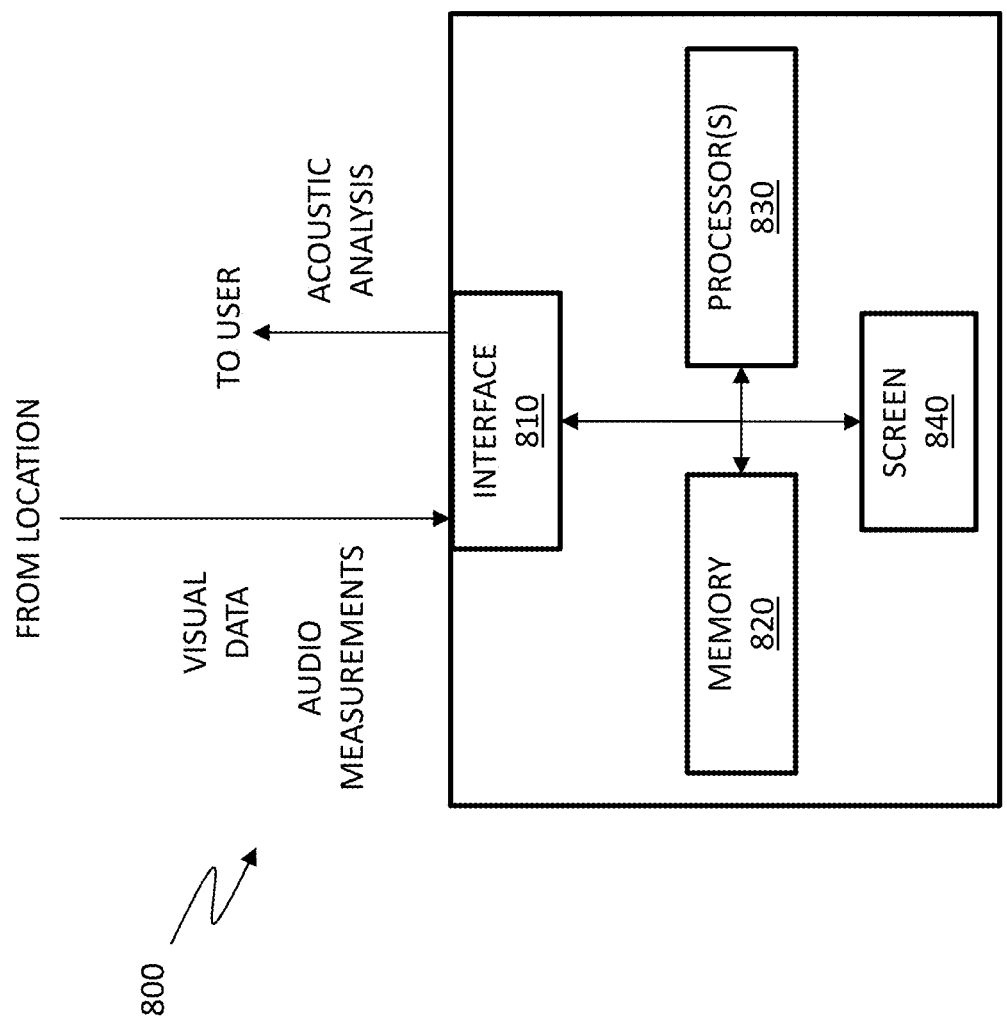
FIG. 8 illustrates a block diagram of an example of a computing system that provides acoustic analysis for a location according to the principles of the disclosure.

FIG. 8 illustrates a block diagram of an example of a computing device 700 that provides acoustic analysis for a location according to the principles of the disclosure. The computing device 800 can be, for example, a mobile computing device, a desktop computer, or a server located in a data center. The computing device 800 includes an interface 810, a memory 820, one or more processors represented by processor 830, and a screen 840 that are communicatively connected to one another using, for example, conventional means. It is understood that the number of processors and the configuration that can be used for the computing device 800 is not limited as illustrated. For example, computing device 800 may not include screen 840.

Interface 810 is configured to communicate, i.e., transmit and receive, data. As such, interface 810 includes the necessary logic and circuitry to communicate data. The interface 810 can be a conventional interface. The interface 810 receives visual data from a location and provides an acoustic analysis based at least on the visual data. The interface 810 can also receive audio measurements from the location. The visual data and audio measurements can be obtained from the same device and sent to the computing device 800 via the interface 810. For example, a single mobile communication device, such as mobile computing device 290, can obtain and send both the visual data and the audio measurements. Accordingly, mobile computing device 290 can include one or more camera, at least one microphone, and at least one processor that coordinates obtaining visual data of a location using the one or more camera and audio measurements at the location using the at least one microphone. The mobile computing device 290 can also include a memory, such as a non-transitory memory, that stores a series of operating instructions that correspond to one or more algorithms obtaining the visual data and audio measurements. At least a portion of the visual data corresponds to obtaining the audio measurements and includes a position of the at least one microphone when obtaining the audio measurements. The microphone can be, for example, the microphone of the mobile computing device 290 or microphone 295.

Memory 820 can be a non-transitory memory that stores data, e.g., the visual data, audio measurements, and user inputs for modification and verification, which is used for performing acoustic analysis according to the principles of the disclosure. The memory 820 also store a series of operating instructions corresponding to one or more algorithms that when executed, cause the processor 830 to perform acoustic analysis using at least the visual data. The operating instruction can correspond to one or more steps of method 100. For example, the operating instructions can direct the processor 830 to generate a geometric model, simulate movement of sound waves using the geometric model, generate an acoustic analysis based on the simulated sound wave movement, and modify the acoustic analysis according to the user inputs. The memory 820 may be a conventional memory device such as flash memory, ROM, PROM, EPROM, EEPROM, DRAM, SRAM, etc.

Processor 830 can be a data processing unit, such as a central processing unit (CPU) or a graphics processing unit (GPU), which can operate according to the operating instructions stored on the memory 820. As noted above, the computing device 800 can include more than one processor and the processors can be of different types.

Screen 840 provides a visual interface for users and can display the acoustic analysis. Additionally, the screen 840 can display prompts and receive inputs from a user for additional information that can be used to generate, modify, or verify the geometric model, the acoustic analysis, or both. For example, the computing device 800 can be a desktop computer that receives, from a server, the geometric model or acoustic analysis and displays these on the screen 840. Instead of being integrated with the interface 810, the memory 820, and the processor 830, the screen 840 can be located external, such as screen 230, and receive the geometric model and/or acoustic analysis via the interface 810 for display. The computing device 800 can be a cloud-based device and the interface 810 can communicate via a cloud-based network environment. Accordingly, the visual data and audio measurements can be received via the network, processing can be performed by a cloud-based server, and the acoustic analysis can be sent via the network to the user.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The data storage media can be part of or associated with the digital data processors or computers.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured means, for example, designed, constructed, or programmed, with the necessary logic and/or features for performing a task or tasks.

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

A network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. In addition to previous examples not as a limitation, a client device may be embodied as a Personal Computer (PC), a laptop computer, a mobile device, a smartphone, a tablet computer, a smart watch, a wearable computer, a Personal Digital Assistant (PDA), a virtual reality headset, a Global Positioning System (GPS) or device, a virtual machine, a robot, a handheld communications device, a gaming device or system, an entertainment system, a remote control, a consumer electronic device, a workstation, an edge device, any combination of these delineated devices, or any other suitable device.

Those skilled in the art to which this application relates will appreciate that other and further additions, deletions, substitutions and modifications may be made to the described embodiments.

Various aspects of the disclosure can be claimed including those noted in the summary. Each of the aspects noted in the summary may have one or more of the elements of the dependent claims presented below in combination.

What is claimed is:

1. A method for improving acoustics at a location, comprising:
    generating a geometric model of a location using visual data obtained from the location, wherein the location includes an audio system and the geometric model includes a configuration of the audio system obtained from the visual data; and
    simulating, using the geometric model, movement of sound waves in the location that originate from the audio system.

2. The method as recited in claim 1, further comprising providing an acoustic analysis for the location based on the simulating.

3. The method as recited in claim 2, wherein the acoustic analysis includes potential audio issues associated with configuration of the audio system, configuration improvements for the audio system, configuration improvements for the location, or a combination thereof.

4. The method as recited in claim 1, further comprising obtaining the visual data using a mobile computing device.

5. The method as recited in claim 4, wherein the visual data includes one or more of photographs, video, LiDAR data, or positional data.

6. The method as recited in claim 1, wherein the geometric model includes estimated objects, surfaces, layout, and material information.

7. The method as recited in claim 1, wherein the generating the geometric model includes reconstructing surface geometries, reconstructing material of the geometries, detecting objects, estimating object poses, estimating listener position, and estimating screen position.

8. The method as recited in claim 1, further comprising verifying the geometric model before the simulating.

9. The method as recited in claim 1, wherein the simulating includes computing the movement of the sound waves from the audio system to at least one listener's position represented in the geometric model.

10. The method as recited in claim 9, wherein the computing uses a physically based audio wave propagation model.

11. The method as recited in claim 1, wherein the simulating includes multiple iterations using different modifications of the geometric model.

12. The method as recited in claim 1, wherein the audio system includes multiple speakers and the simulating includes adjusting frequency equalization per each of the speakers and improving output of the speakers based on a listener's position represented in the geometric model.

13. The method as recited in claim 1, further comprising obtaining audio measurements at the location using a microphone and providing acoustic analysis using the audio measurements.

14. The method as recited in claim 13, wherein at least a portion of the visual data corresponds to obtaining the audio measurements and the method further comprises estimating a position of the microphone using the at least a portion of the visual data.

15. The method as recited in claim 13, wherein the acoustic analysis includes gain normalization and frequency equalization for the audio system.

16. The method as recited in claim 1, wherein the location is a room.

17. A computing system for improving acoustics at a location, comprising:
    one or more processors to perform operations including:
        generating a geometric model of a location using visual data obtained from the location, wherein the location includes an audio system and the geometric model includes a configuration of the audio system obtained from the visual data; and
        simulating, using the geometric model, movement of sound waves in the location that originate from the audio system.

18. The computing system as recited in claim 17, wherein the operations further include providing an acoustic analysis for the location based on the simulating.

19. The computing system as recited in claim 18, wherein providing the acoustic analysis includes using audio measurements from the location.

20. The computing system as recited in claim 18, wherein the acoustic analysis includes potential audio issues associated with configuration of the audio system and configuration improvements for the audio system.

21. The computing system as recited in claim 20, wherein the acoustic analysis further includes potential audio issues associated with configuration of objects in the location and configuration improvements for the objects.

22. The computing system as recited in claim 18, wherein the generating the geometric model includes one or more of reconstructing surface geometries, reconstructing material of the geometries, detecting objects, estimating object poses, estimating listener position, and estimating screen position.

23. The computing system as recited in claim 18, wherein the one or more operations include verifying the geometric model before the simulating.

24. The computing system as recited in claim 18, wherein the simulating includes computing the movement of the sound waves from the audio system to at least one listener's position using a physically based audio wave propagation model.

25. The computing system as recited in claim 24, wherein the simulating includes multiple iterations using different modifications of the geometric model.

26. The computing system as recited in claim 18, wherein the one or more processors are located with a server in a cloud computing environment.

27. A non-transitory computer readable medium having a series of operating instructions that direct operations of one or more processors to improve acoustics at a location, the operations including:

generating a geometric model of a location using visual data obtained from the location, wherein the location includes an audio system and the geometric model includes a configuration of the audio system obtained from the visual data; and simulating, using the geometric model, movement of sound waves in the location that originate from the audio system.

* * * * *